United States Patent
Loffink et al.

(10) Patent No.: US 8,935,555 B2
(45) Date of Patent: Jan. 13, 2015

(54) WAKE-ON-LOCAL-AREA-NETWORK OPERATIONS IN A MODULAR CHASSIS USING A VIRTUALIZED INPUT-OUTPUT-VIRTUALIZATION ENVIRONMENT

(75) Inventors: John Loffink, Austin, TX (US); Alan Brumley, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 13/592,970

(22) Filed: Aug. 23, 2012

(65) Prior Publication Data
US 2014/0059370 A1  Feb. 27, 2014

(51) Int. Cl.
G06F 1/00   (2006.01)
G06F 1/26   (2006.01)

(52) U.S. Cl.
USPC ............................ 713/323; 713/300; 713/320

(58) Field of Classification Search
USPC ....................................................... 713/323
See application file for complete search history.

(56) References Cited

U.S. PATENT DOCUMENTS

| | | | | |
|---|---|---|---|---|
| 7,325,149 B2 * | 1/2008 | Liu et al. | | 713/300 |
| 7,673,162 B2 * | 3/2010 | Nishi | | 713/323 |
| 8,077,712 B2 * | 12/2011 | Evans | | 370/389 |
| 8,332,869 B2 * | 12/2012 | Stevens, IV | | 719/315 |
| 8,713,336 B2 * | 4/2014 | Nishibayashi et al. | | 713/320 |
| 2003/0126486 A1 * | 7/2003 | Bui | | 713/320 |

* cited by examiner

Primary Examiner — Suresh Suryawanshi
(74) Attorney, Agent, or Firm — Jackson Walker L.L.P.

(57) ABSTRACT

A method for waking an information handling system includes receiving in a chassis a plurality of modular information handling systems and a plurality of modular information handling resources, routing access of one of the modular information handling resources to one or more of the plurality of modular information handling systems, monitoring a plurality of power management event lines, determining a wake message received at one of the modular information handling resources, determining which of the plurality of modular information handling systems is associated with the received wake message, forwarding a wake signal to the determined modular information handling system, and powering on the determined information handling system. The modular information handling resource is configured to receive a wake message. Each line is coupled one of the modular information handling resources.

43 Claims, 3 Drawing Sheets

WAKE-ON-LOCAL-AREA-NETWORK OPERATIONS IN A MODULAR CHASSIS USING A VIRTUALIZED INPUT-OUTPUT-VIRTUALIZATION ENVIRONMENT

TECHNICAL FIELD

The present disclosure relates in general to information handling systems, and more particularly to Wake-on-local-area-network operations in a modular chassis using a virtualized input-output-virtualization environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output ("I/O") resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with removal of information handling resources in a shared input/output infrastructure have been reduced or eliminated.

In accordance with some embodiments of the present disclosure, a system includes a chassis configured to receive a plurality of modular information handling systems and a plurality of modular information handling resources, one or more switches configured to route access of one of the modular information handling resources to one or more of the modular information handling systems, a plurality of power management event lines, and one or more chassis management controllers housed in the chassis. The modular information handling resource is configured to receive a wake message. Each power management event line couples one of the modular information handling resources to a chassis management controller. The one or more chassis management controllers are housed in the chassis and are configured to determine which of the plurality of modular information handling systems is associated with a received wake message and forward a wake signal to the determined modular information handling system. The wake signal corresponds to the received wake message. The information handling system receiving the signal is configured to power itself on.

In accordance with other embodiments of the present disclosure, a method for waking an information handling system includes receiving in a chassis a plurality of modular information handling systems and a plurality of modular information handling resources, routing access of one of the modular information handling resources to one or more of the plurality of modular information handling systems, monitoring a plurality of power management event lines, determining a wake message received at one of the modular information handling resources, determining which of the plurality of modular information handling systems is associated with the received wake message, forwarding a wake signal to the determined modular information handling system, and powering on the determined information handling system. The modular information handling resource is configured to receive a wake message. Each line is coupled one of the modular information handling resources.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
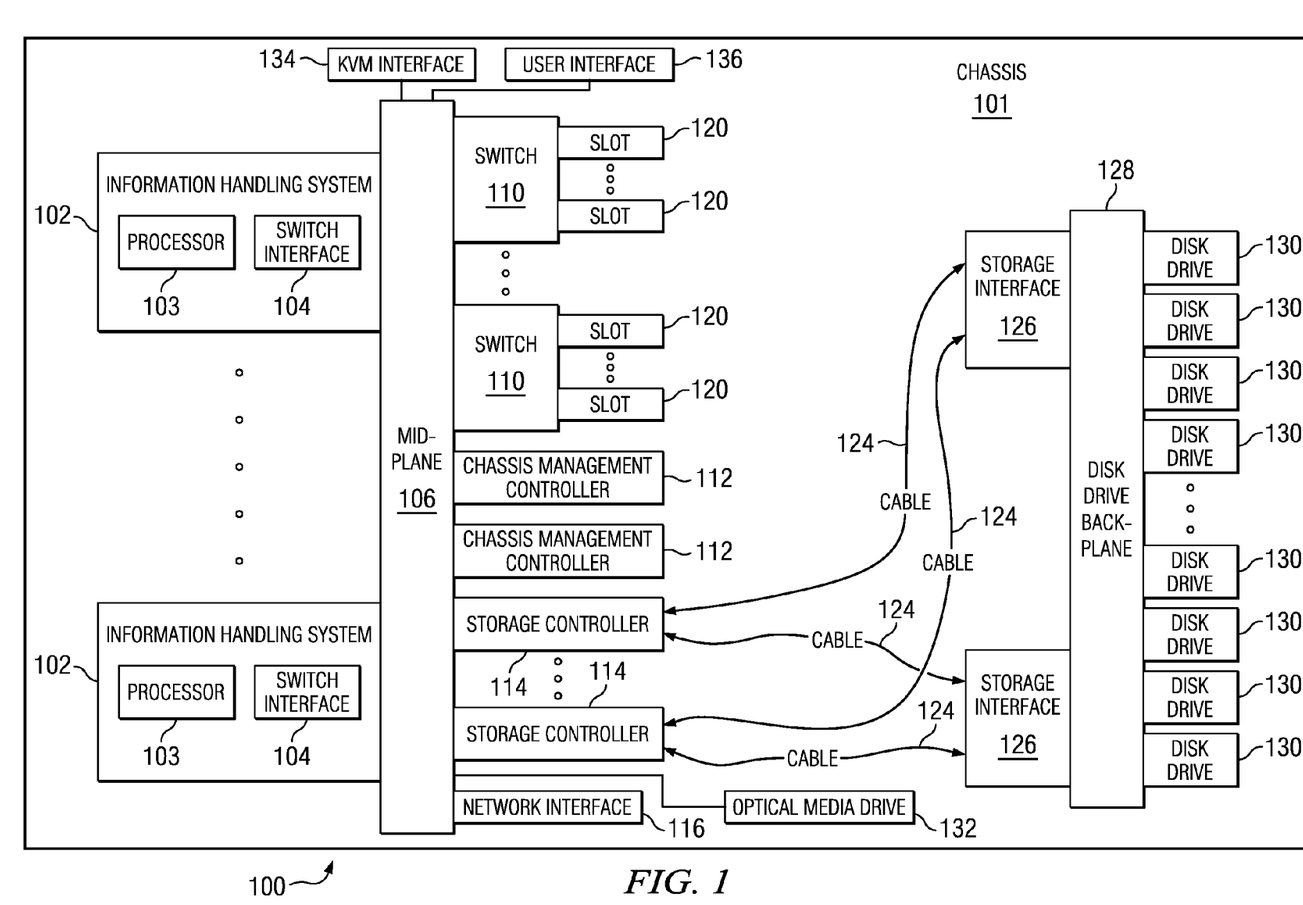
FIG. 1 illustrates a block diagram of an example system chassis with multiple information handling systems and with various peripheral and input/output capabilities common to the chassis as a whole, in accordance with certain embodiments of the present disclosure.
Figure 2:
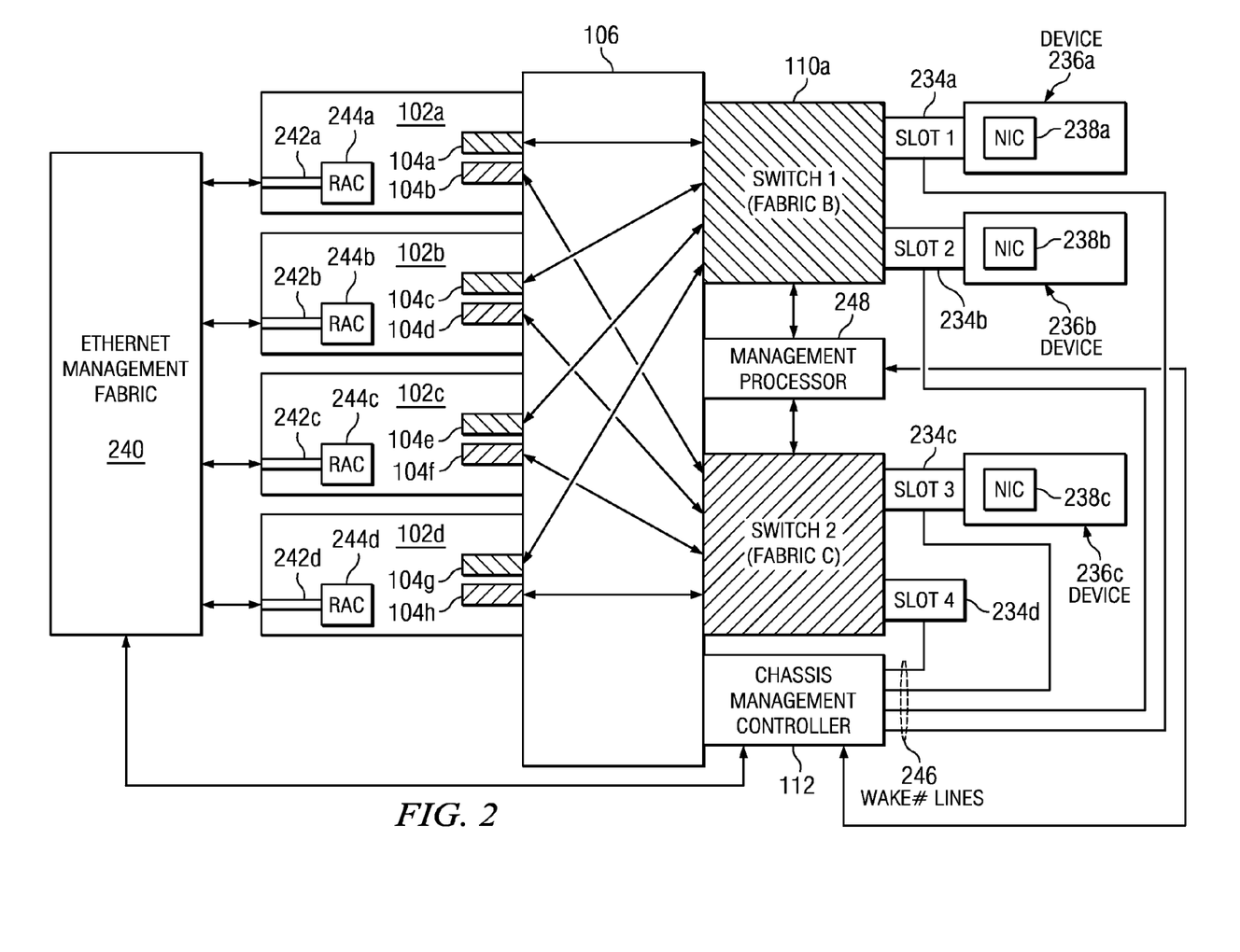
FIG. 2 illustrates a more detailed block diagram of the example system configured to provide wake-on-local-area-network operations in a modular chassis using input-output virtualization, in accordance with certain embodiments of the present disclosure.

Preferred embodiments and their advantages are best understood by reference to FIGS. 1, 2A, and 2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components or the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to the processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component its component information handling resources. A chassis management controller 102 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface ("IPMI") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low-profile to mid-plane 106, a switch 110, or another components, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with greater number (e.g., 25) disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling information handling resources (e.g., Peripheral Component Interconnect Express ("PCIe") adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at time. Chassis management controller 112 may be configured to handle routing and switching through switches 110 to affect sharing or a resource to multiple information handling systems 102 or to affect dedicated assignment of a resource to a single information handling system 102.

FIG. 2 illustrates a more detailed block diagram of example system 100 configured to provide wake on local area network ("LAN") in the modular chassis 101 using input-output virtualization ("IOV") in accordance with certain embodiments of the present disclosure.

Mid-plane 106 may include management processor 248 communicatively coupled to one or more of chassis management controllers 112 and switches 110. Management processor 248 may be any system, device, or apparatus configured to facilitate management and/or control of switches 110. Management processor 248 may be configured to issue commands and/or other signals to switches 110. Management processor 248 may comprise a microprocessor, microcontroller, DSP, ASIC, EEPROM, or any combination thereof. As shown in FIG. 2, management processor 248 may be resident on mid-plane 106. In one embodiment, management processor 248 may run a Linux operating system and include application-programming-interfaces ("APIs") for supporting configuration of IOV in system 100 for sharing devices connected to slots of chassis 101 to multiple information handling systems 102. The APIs of management processor 248 may provide the interface to chassis management controller 112 for configuring IOV. In one embodiment, the hardware or functionality of management processor 248 may be incorporated into chassis management controller 112. In such an embodiment, the functionality may be implemented as software in the form of a software service.

In one embodiment, management processor 248 may be communicatively coupled to Ethernet management fabric 240. In another embodiment, management processor 248 may be configured to manage both switches 110. Chassis 101 may include any suitable number of management processors 248. In one embodiment, chassis 101 may include a management processor implemented in similar fashion to management processor 248 for every switch in chassis 101.

Switches 110 may contain PCIe mezzanine cards instead of the typical blade Ethernet, Fibre Channel or InfiniBand cards. Switch interfaces 104 of the information handling systems 102 may attach to switches 110 through the mezzanine cards of switches 110. Switches 110 may connect information handling systems 102 to slots 234. Slots 234 may include one or more of the slots 120 of FIG. 1 in any suitable combination.

In one embodiment, each of information handling systems 102 may be communicatively coupled to each of switches 110 through one of switch interfaces 104 resident on the information handling system 102. For example, information handling system 102a may be communicatively coupled to switch 110a through switch interface 104a and to switch 110b through switch interface 104b; information handling system 102b may be communicatively coupled to switch 110a through switch interface 104c and to switch 110b through switch interface 104d; information handling system 102c may be communicatively coupled to switch 110a through switch interface 104e and to switch 110b through switch interface 104f; and information handling system 102d may be communicatively coupled to switch 110a through switch interface 104g and to switch 110b through switch interface 104h. Thus, each of switches 110 may provide its switching fabric to each of information handling systems 102 in order to route the given information handling system 102 to respective slots 234 associated with the switch 110.

Slots 234 may be configured to connect to associated devices 236, though fewer devices may be present than the associated capacity of chassis 101. Each such device 236 may represent one or more information handling resources to be selectively, for example, shared among multiple information handling system 102 or dedicated to a single information handling system 102. While the information handling resource may be dedicated to a single information handling system 102, the configuration of chassis 101 may nonetheless require mapping of the information handling resource to the specific information handling system 102 amongst the multiple possible systems. Device 236 may comprise, for example, a RAID controller. Furthermore, device 236 may include any suitable specific component to be shared or dedicated, such as a network interface card ("NIC") 238, universal serial bus ("USB") device, keyboard, or other device. In one embodiment, device 236 may include multiple such information handling resources.

In order to support IOV, the driver and firmware of device 236 may include support for single root IOV. To maintain routes between given information handling systems 102 and slots 234, switches 110 may include virtual hierarchies from slots 234 to information handling systems 102. Particular functions, such as virtual functions or shared functions, for single root IOV for a given device 236 may be mapped in switch 110, providing behavior similar to multiple-root IOV. In one embodiment, wherein device 236 contains multiple information handling resources such as a NIC and USB interface, a function may be provided for each such information handling resource. Thus, from the perspective of information handling systems 102 the multiple such information handling resources may appear to be separate and unrelated. A given slot 234 or device 236 which has been virtualized may be accessed by two or more virtual functions, which allow the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Furthermore, specific APIs for accessing a given device 236 may be mapped or stored in management processor 248. Chassis management controller 112 may be configured to access these physical functions or APIs in management processor 248.

On a typical non-shared information handling resource, a resource such as a NIC may be in a power-off state when a host information handling system is also off. Other portions of the information handling system may or may not be shut off. Upon receipt of a packet of pre-determined contents or form, the information handling resource such as a NIC may assert a power event as specified in the PCIe standard. Such an event message may be known as a Wake on LAN ("WOL"). Other information handling resources, such as a USB port, may similarly receive messages configured to wake an associated information handling system 102. Furthermore, the received messages for which a power event may be asserted may be configurable. For example, a particular read or write message received through a USB port may be configured as a wake event.

Because information handling resources, such as NICs 238 on devices 236 coupled to slots 234, are not located within an information handling system 102, but rather in a shared chassis using switches 110 to optionally virtualize and route input/output communications among selected information handling systems 102, powering of such information handling resources may not be directly controlled by an associated information handling system 102. Furthermore, PCIe standards include a signal, such as PCIe Wake, which when received by an information handling system 102 triggers specified power-on activity from a stand-by or reduced-power state. Other standards or protocols for triggering specified power-on activity when particular signals are received may be similarly utilized. However, because the device is access switched and optionally virtualized, the signal may not be accessible to the information handling system 102. Switches 110 may not have provisions for handling wake-on signals. Such conditions may exist for information handling resources to be dedicated to a single information handling system 102, for multiple information handling resources on a single device 236, and for information handling resources to be virtualized to multiple information handling systems 102.

Hence, wake signals such as a wake on LAN signal, which may be used to power-on various portions of an information handling system 102 not at full power, received from an information handling resource such as NIC 238 on device 236 may not be directly routable as a signal such as a PCIe Wake signal to information handling systems 102. Accordingly, when an information handling system 102 is in a reduced-power state such as standby mode, a mechanism may be used for waking the information handling system 102 upon receipt of a wake-on signal at an associated device 236.

Each device 236 may be configured to produce a wake-on signal such as a PCIe WAKE signal. In embodiments wherein device 236 contains multiple types of devices, each such device (such as a USB port or NIC) may be configured to produce a wake-on signal. Each slot 234 may be connected through any suitable communication conduit to general-purpose input-output pins on an appropriate device, such as chassis management controller 112. Such a communication conduit may be configured to communicate wake-on signals or messages. The communication conduit may be implemented by, for example, a power management event ("PME") line or a wake number line. The communication conduit may be, for example, physical, switched, or routed. Although wake number lines 246 are illustrated in the example of FIG. 2, any such implementation may be used. The communication protocol may reflect the conduit chosen, or vice-versa. For example, physical lines may communicate electrical signals for indicating wake-on signals and events, while PME lines may communicate PME messages for indicating wake-on signals and events.

In one embodiment, chassis management controller 112 may include or be communicatively coupled to a general-purpose input-output expander card through an I²C bus. In a further embodiment, each slot 234 may route its PME line separately because the wake-on signals may not be bussed together.

Chassis management controller 112 may be configured to monitor wake number lines 246. Upon detection of a wake-on signal, chassis management controller 112 may be configured to determine, from the configuration of the fabrics of switches 110, the information handling system 102 associated with the wake-on signal. Chassis management controller 112 may be configured to send an appropriate signal configured to wake-up the associated information handling system 102. Any suitable mechanism for notifying the information handling system 102 may be used.

Chassis management controller 112 may be communicatively coupled to the information handling systems 102 through Ethernet management fabric 240. Chassis management controller 112 may be directly communicatively coupled to the Ethernet management fabric 240 or through, for example, management processors 248. An information handling system 102 may be configured to receive wake signals through connector 242.

In one embodiment, chassis management controller 112 may be configured to generate a WOL IPMI command to the appropriate information handling system 102. Subsequently, information handling system 102 may be configured to operate as if it had received such a command from an on-board NIC, wherein it may power on from the Wake-On LAN command. Further, chassis management controller 112 may attach additional information to an IPMI command to specify which slot 234 generated the message.

In another embodiment, chassis management controller 112, alone or in concert with management processor 248, may inject a wake signal on a time division multiplexed shifty bus shared amongst information handling systems 102. The wake signal may comprise a bit on the bus. In such an embodiment, a switch fabric such as Ethernet management fabric may not be necessary and each information handling system 102 may be connected directly. The information for a given information handling system 102 on the time division multiplex shifty bus may arrive in predetermined increments of time. For example, for a four-slot chassis 101 for four information handling systems 102, every fourth data unit may be designated for information handling system 102a. Information handling system 102 may decode the command, determine that it is a wake-on signal, and power up portions of information handling system 102 accordingly.

In still yet another embodiment, chassis management controller 112, alone or in concert with management processor 248, may inject a wake signal on a general-purpose input-output line. Such a general-purpose input-output line may be implemented, for example, with a dedicated line between chassis management controller 112, alone or in concert with management processor 248, and a given information handling system 102. The wake signal may comprise a bit on the bus. Such a bit may be multiplexed through any suitable mechanism. In such an embodiment, a switch fabric such as Ethernet management fabric may not be necessary and each information handling system 102 may be connected to chassis management controller 112 through dedicated lines. Information handling system 102 may decode the command, determine that it is a wake-on signal, and power up portions of information handling system 102 accordingly.

In various embodiments, upon receipt of a wake signal from the rest of chassis 101, information handling system 102 may generate a hardware power-on sequence. In various other embodiments, upon receipt of a wake signal from the rest of chassis 101, information handling system 102 may include a remote-access-controller 244 for a subsequent software initiation of a power-on sequence. Remote-access-controller 244 may be configured for out-of-band operation of information handling system 102 by chassis 101, wherein information handling system 102 may be managed without operation of the main processor of information handling system 102. Remote-access-controller 244 may include its own processor, memory, and Ethernet port separate and apart from information handling system 102.

If multiple information handling systems 102 are sharing a device 236 with a NIC 238, then access to NIC 238 may be divided into multiple virtual NICs using virtual functions, each of which are mapped by switches 110 to the respective information handling system 102. In one embodiment, chassis management controller 112 may be configured to determine through which virtual NIC the wake-up packet was received. In another embodiment, management processor 248 may be configured to determine through which virtual NIC the wake-up packet was received. Whichever component is used to make the determination, the configuration and mapping, as maintained by switches 110, of virtual functions of slot 234 to the plurality of information handling systems 102 may be explored. The creator or vendor of device 236 may provide table-lookup, packet information, or other mechanisms by which a wake-up packet identifying a virtual NIC may be translated to determine the mapping.

In various embodiments, WOL commands may be supported only if chassis 101 is powered on and not in a standby mode. Chassis management controller 112 may be configured to control the power functions of chassis 101 in lieu of such capabilities residing in information handling systems 102. Thus, wake-on signals may be limited in scope to power functions of individual information handling systems 102. Chassis management controller 112 may be configured to handle wake events for chassis 101 itself through, for example, packets received at network interface 116.

Figure 3:
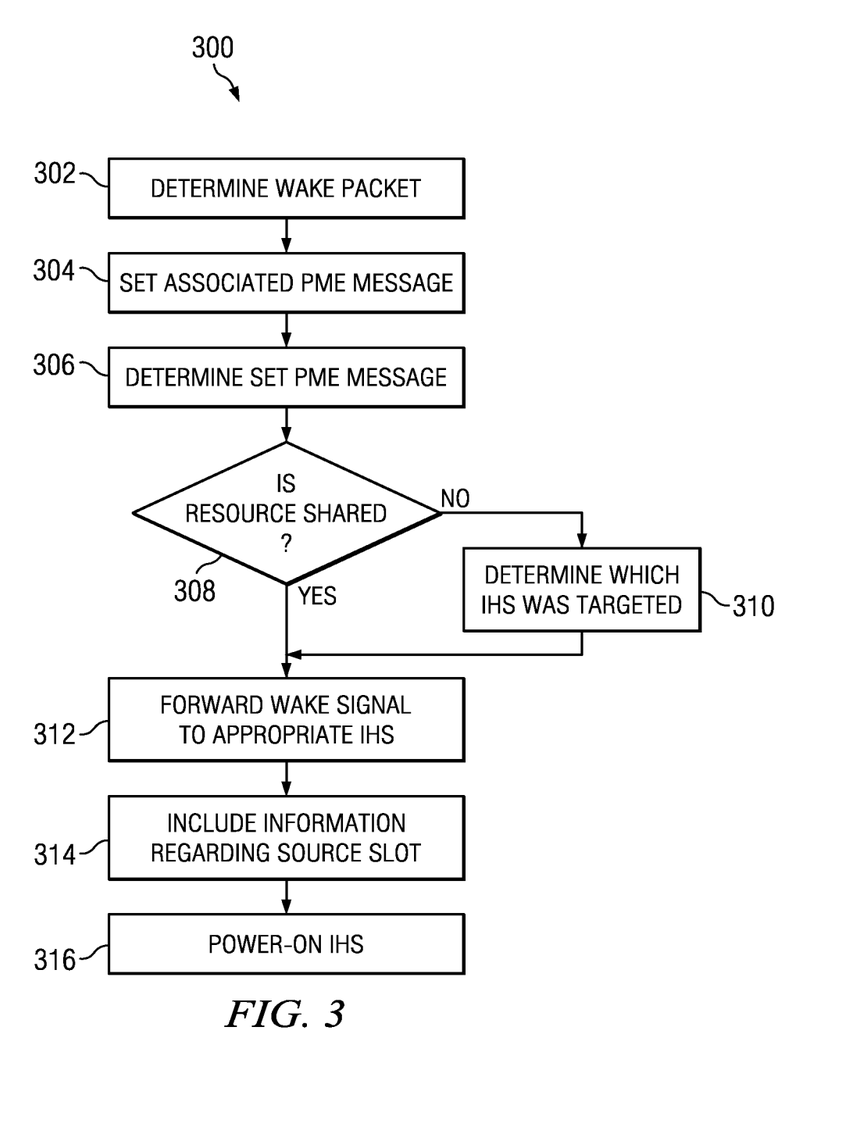
FIG. 3 illustrates a flow chart of an example method for wake-on-local-area-network operation in a modular chassis using a virtualized input-output-virtualization environment, in accordance with the present disclosure.

FIG. 3 illustrates a flow chart of an example method 300 for wake on local area network in a modular chassis using a virtualized input-output-virtualization environment, in accordance with the present disclosure. According to certain embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

Method 300 may begin in response to any suitable stimulus or trigger. For example, method 300 may be invoked in response to a receipt of a packet at an information handling resource such as NIC 238 or a USB port. The packet may be specially configured to wake a given information handling system 102. Such a packet may be a WOL packet, "magic" packet, or other suitable mechanism. In these and other embodiments, method 300 may be implemented as firmware, software, applications, functions, libraries, or other instructions continually monitoring slots 234 for such packets. As a precondition for method 300, chassis 101 may have shut down one or more information handling systems 102 into a sleep, standby, or other power-saving mode. Chassis 101 may have shut down information handing system 102 for any suitable reason, such as inactivity.

At step 302, a wake packet may be determined at NIC 238 on a device 236 coupled to chassis 100 at slot 234, or at another suitable portion of chassis 100 such as a USB port on device 236. In step 304, the determination of the receipt of a wake packet may cause the setting of an associated wake number line 246 from slot 234 to another suitable portion of chassis 101 such as chassis management controller 112. If device 236 includes multiple information handling resources, then each such resource may trigger an individually associated wake number line 246.

In step 306, chassis management controller 112 may be continually monitoring wake number lines 246 for any indication from an associated slot 234 that a wake packet has been received. If a wake packet has been received, then in step 308 chassis management controller 112 may determine whether the information handling resource such as device 236 associated with the packet reception is shared among a plurality of information handling systems 102 or is associated with a single information handling system 102. Such determination may be made by reference to a table, map, database, and/or other suitable data structure accessible to chassis management controller 112 or management processor 248 (e.g., stored on a computer-readable medium present within system 100). If the information handling resource associated with the packet reception—such as device 236—is shared among a plurality of information handling systems 102, method 300 may proceed to step 310. Otherwise, if the information handling resource is not shared, method 300 may proceed to step 312.

At step 310, in response to a determination that the information handling resource is shared, chassis management controller 112 may determine the associated information handling system 102. Such a determination may be made by examining the mappings maintained by switches 101 and by the packet received at slot 234. Once the correct information handling system 102 is identified, at step 312 a wake signal may be forwarded to the appropriate information handling system 102.

In one embodiment, the wake signal to be forwarded may include a WOL IPMI command sent through Ethernet management fabric 240. In another embodiment, the wake signal may be sent through a TDM connection at a frequency or time-slice configured to address the correct information handling system 102. In step 314, additional information identifying the slot 234 which received the packet may be included.

In step 316, the information handling system 102 may receive the signal and may initiate a power-on sequence. The sequence may include, for example, hardware power-on or listening for additional software power-on signals.

After completion of step 316, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof or any other system operable to implement method 300. In certain embodiments, method 300 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a chassis configured to receive a plurality of modular information handling systems and at least one modular information handling resource configured to receive a wake message;
   one or more switches configured to communicatively couple the at least one modular information handling resource received in the chassis to one or more modular information handling systems received in the chassis and to route access of one of the at least one modular information handling resource to the one or more modular information handling systems;
   at least one power management event line, each power management event line configured to couple the at least one modular information handling resource to a chassis management controller housed in the chassis;
   the chassis management controller, configured to:
   monitor the at least one power management event line for an indication communicated from the at least one modular information handling resource that a wake message has been received;
   determine which of the plurality of modular information handling systems is associated with a received wake message; and forward a wake signal to the determined modular information handling system, the wake signal corresponding to the received wake message;

wherein the information handling system receiving the signal is configured to power itself on based on the received signal.

2. The system of claim 1, wherein the at least one modular information handling resource is configured to be used by a single determined information handling system.

3. The system of claim 1, wherein the switches are further configured to virtualize access of the at least one modular information handling resource to two or more of the plurality of modular information handling systems, the modular information handling systems sharing the modular information handling resource.

4. The system of claim 3, wherein the at least one modular information handling resource is configured to be shared by using multiple virtual network interface cards.

5. The system of claim 3, wherein the at least one modular information handling resource is configured to be shared using multiple virtual functions.

6. The system of claim 1, wherein the chassis management controller is configured to forward the wake signal using a wake-on-local-area-network Intelligent Platform Management Interface command.

7. The system of claim 1, wherein the chassis management controller is configured to forward the wake signal across a switching fabric to the determined modular information handling system.

8. The system of claim 1, wherein the chassis management controller is further configured to forward an indication of which of the plurality of modular information handling resources received the wake message.

9. The system of claim 1, wherein the chassis management controller is configured to forward the wake signal by setting information on a time-division-multiplexing bus.

10. The system of claim 7, wherein the chassis management controller is configured to determine which of the plurality of modular information handling systems is associated with a received wake message based upon:
a mapping of virtualized access of the at least one modular information handling resource, the mapping included in the switches; and
the received message.

11. The system of claim 1, wherein the at least one modular information handling resource includes a network interface chip configured to receive a wake message.

12. The system of claim 1, wherein the chassis management controller is configured to forward the wake signal using a general purpose input-output line.

13. A method for waking a modular information handling system disposed in a chassis configured to receive a plurality of modular information handling systems and at least one modular information handling resource configured to receive a wake message, comprising:
using one or more switches, communicatively coupling the at least one modular information handling resource received in the chassis to one or more modular information handling systems received in the chassis and routing access of the at least one modular information handling resource to the one or more modular information handling systems;
monitoring at least one power management event line configured to couple the at least one modular information handling resource to a chassis management controller housed in the chassis for an indication communicated from the at least one modular information handling resource that a wake message has been received;
determining which of the plurality of modular information handling systems is associated with a received wake message;
forwarding a wake signal to the determined modular information handling system, the wake signal corresponding to the received wake message; and
powering on the determined information handling system.

14. The method of claim 13, wherein the at least one modular information handling resource is configured to be used by a single determined information handling system.

15. The system of claim 13, further comprising using the switches to virtualize access of the at least one modular information handling resource to two or more of the plurality of modular information handling systems, the modular information handling systems sharing the at least one modular information handling resource.

16. The method of claim 15, further comprising sharing the at least one modular information handling resource across multiple virtual network interface cards.

17. The method of claim 15, further comprising sharing the at least one modular information handling resource using multiple virtual functions.

18. The method of claim 13, further comprising forwarding the wake signal using a wake-on-local-area-network Intelligent Platform Management Interface command.

19. The method of claim 13, further comprising forwarding the wake signal to the determined modular information handling system across a switching fabric.

20. The method of claim 13, wherein the wake signal is forwarded by setting information on a time-division-multiplexing bus.

21. The method of claim 13, further comprising determining which of the plurality of modular information handling systems is associated with a received wake message based upon:
a mapping of virtualized access of the modular information handling resources, the mapping included in the switches; and
the received message.

22. The method of claim 13, wherein the at least one modular information handling resource includes a network interface chip configured to receive a wake message.

23. The method of claim 13, further comprising forwarding the wake signal using a general purpose input-output line.

24. A system comprising:
a chassis configured to receive a plurality of modular information handling systems and at least one modular information handling resource configured to receive a wake message;
at least one power management event line, each power management event line configured to couple the at least one modular information handling resource to a chassis management controller housed in the chassis;
the chassis management controller, configured to:
monitor the at least one power management event line for an indication communicated from the at least one modular information handling resource that a wake message has been received;
determine which of the plurality of modular information handling systems is associated with a received wake message; and
forward a wake signal to the determined modular information handling system, the wake signal corresponding to the received wake message;

wherein the information handling system receiving the signal is configured to power itself on based on the received signal.

25. The system of claim 24, wherein the at least one modular information handling resource is configured to be used by a single determined information handling system.

26. The system of claim 24, wherein the chassis management controller is configured to forward the wake signal using a wake-on-local-area-network Intelligent Platform Management Interface command.

27. The system of claim 24, wherein the chassis management controller is configured to forward the wake signal across a switching fabric to the determined modular information handling system.

28. The system of claim 24, wherein the chassis management controller is further configured to forward an indication of which of the plurality of modular information handling resources received the wake message.

29. The system of claim 24, wherein the chassis management controller is configured to forward the wake signal by setting information on a time-division-multiplexing bus.

30. The system of claim 24, wherein the chassis management controller is configured to determine which of the plurality of modular information handling systems is associated with a received wake message based upon:
- a mapping of virtualized access of the at least one modular information handling resource; and
- the received message.

31. The system of claim 24, wherein the at least one modular information handling resource includes a network interface chip configured to receive a wake message.

32. The system of claim 24, wherein the chassis management controller is configured to forward the wake signal using a general purpose input-output line.

33. A method for waking a modular information handling system disposed in a chassis configured to receive a plurality of modular information handling systems and at least one modular information handling resource configured to receive a wake message, comprising:
- communicatively coupling the at least one modular information handling resource received in the chassis to one or more modular information handling systems received in the chassis and routing access of the at least one modular information handling resource to the one or more modular information handling systems;
- monitoring at least one power management event line configured to couple the at least one modular information handling resource to a chassis management controller housed in the chassis for an indication communicated from the at least one modular information handling resource that a wake message has been received;
- determining which of the plurality of modular information handling systems is associated with a received wake message;
- forwarding a wake signal to the determined modular information handling system, the wake signal corresponding to the received wake message; and
- powering on the determined information handling system.

34. The method of claim 33, wherein the at least one modular information handling resource is configured to be used by a single determined information handling system.

35. The system of claim 33, further comprising virtualizing access of the at least one modular information handling resource to two or more of the plurality of modular information handling systems, the modular information handling systems sharing the at least one modular information handling resource.

36. The method of claim 35, further comprising sharing the at least one modular information handling resource across multiple virtual network interface cards.

37. The method of claim 35, further comprising sharing the at least one modular information handling resource using multiple virtual functions.

38. The method of claim 33, further comprising forwarding the wake signal using a wake-on-local-area-network Intelligent Platform Management Interface command.

39. The method of claim 33, further comprising forwarding the wake signal to the determined modular information handling system across a switching fabric.

40. The method of claim 33, wherein the wake signal is forwarded by setting information on a time-division-multiplexing bus.

41. The method of claim 33, further comprising determining which of the plurality of modular information handling systems is associated with a received wake message based upon:
- a mapping of virtualized access of the modular information handling resources; and
- the received message.

42. The method of claim 33, wherein the at least one modular information handling resource includes a network interface chip configured to receive a wake message.

43. The method of claim 33, further comprising forwarding the wake signal using a general purpose input-output line.

* * * * *